United States Patent [19]

Benton et al.

[11] 4,267,292

[45] May 12, 1981

[54] ADDITION OF CHLORINE COMPOUND TO ZIEGLER POLYMERIZATION PROCESS

[75] Inventors: Kenneth C. Benton, Garfield Heights, Ohio; James F. White, Westchester, Pa.; Curtis E. Uebele, Bedford; Raymond J. Weinert, Jr., Garfield Heights, both of Ohio

[73] Assignee: The Standard Oil Company, Cleveland, Ohio

[21] Appl. No.: 106,814

[22] Filed: Dec. 26, 1979

[51] Int. Cl.$^3$ .............................. C08F 2/00; C08F 2/14
[52] U.S. Cl. .................................. 526/79; 252/429 B; 526/137; 526/144; 526/351
[58] Field of Search .......................................... 526/79

[56] References Cited

U.S. PATENT DOCUMENTS

| | | | |
|---|---|---|---|
| 3,072,630 | 1/1963 | De Jong et al. | 526/144 |
| 3,326,872 | 6/1967 | Weber et al. | 526/144 |
| 3,349,064 | 10/1967 | Gumboldt et al. | 526/143 |
| 3,462,399 | 8/1969 | Matthews | 526/115 |
| 3,692,712 | 9/1972 | Crouch | 526/144 |
| 3,957,910 | 5/1976 | Van Den Berg | 526/87 |

*Primary Examiner*—Stanford M. Levin
*Attorney, Agent, or Firm*—William D. Mooney; Herbert D. Knudsen; Larry W. Evans

[57] ABSTRACT

A process for polymerizing alpha-olefins in the presence of a Ziegler-type catalyst wherein at least one of dichloroethane, dichloropropane and chlorine gas is added to the process after the polymerization has been initiated. This invention is especially useful when the olefin is propylene and the catalyst is a titanium trichloride complex.

11 Claims, No Drawings

ADDITION OF CHLORINE COMPOUND TO ZIEGLER POLYMERIZATION PROCESS

BACKGROUND OF THE INVENTION

There are several patents which disclose alpha-olefin polymerization catalysts being treated with halogen-containing organic compounds. The practice of most of these patents involves the direct milling of the solid titanium-containing catalyst component with a halogen-containing organic compound during the course of a complex catalyst preparation procedure. These techniques suffer from reproducibility problems and usually result in a catalyst of low activity.

A few of these patents show that certain halogen-containing compounds can be added before, during or after the polymerization process. For example, U.S. Pat. Nos. 3,957,910, 3,349,064, 3,326,872, 3,072,630, 3,692,712 and 3,462,399 each disclose the addition of halogen compounds to Ziegler-type catalysts. However, all of these processes are disadvantageous for various different reasons.

Among the advantages that the practice of the instant invention offers over the art cited above includes (1) the elimination of a step in the catalyst preparation; (2) increased catalyst activity; (3) increased polymer yield; and (4) an increase in the polymer fraction which is insoluble in hot n-heptane. Furthermore, this invention has the advantage of being applicable to commercially available pre-prepared catalysts. Thus, the product output from the existing polypropylene plants using conventional commercial catalysts can be increased without significant capital expenditures by the use of this invention.

SUMMARY OF THE INVENTION

This invention provides a process for polymerizing alpha-olefins comprising contacting said alpha-olefin with a Ziegler-type catalyst and then adding at least one of dichloroethane, dichloropropane and chlorine gas after said polymerization has been initiated.

More specifically, this invention relates to a process for polymerizing propylene comprising contacting propylene with a Ziegler-type catalyst containing titanium and then adding 1,1-dichloroethane after said polymerization has been initiated.

DETAILED DESCRIPTION

It is well known that alpha-olefins can be polymerized alone to produce homopolymers or in combination to produce interpolymers or copolymers at relatively low pressure using so-called Ziegler catalysts.

Ziegler-type catalysts, in general, are prepared by the reaction of transition metal compounds with organo-metallic compounds. The solid heterogeneous catalyst contains active sites which polymerize alpha-olefins to higher molecular weight polymers and also control the manner of monomer addition. Generally speaking, each new propylene molecule is incorporated in the polymer chain in a manner identical to that of the preceeding propylene molecule. This leads to regularity in structure and allows the polymer to crystallize.

These Ziegler catalysts may be formed by bringing together the transition metal compound in which the transition metal is in a valence state below its normal maximum, for example, titanium trichloride and an organo-metallic compound, for example, aluminum diethylmonochloride, which functions principally as an activator for the transition metal compound. Many forms of Ziegler catalysts have been proposed and, as is well known in the art, there are many transition metal compounds and organo-metallic compounds which may be used to form Ziegler catalysts. Such catalysts may comprise more than one transition metal compound in combination with one or more organo-metallic compounds.

Any transition metal compound in which the transition metal is present in a valence state below its normal maximum and which can function as an olefin polymerization catalyst may be used in carrying out the present invention. Preferably, transition metal halides, alkoxides and alkyls may be used in this invention, wherein the transition metal is at least one of zirconium, vanadium, rhodium, hafnium, titanium and chromium. It is generally preferred to use titanium trichloride as the transition metal compound.

The organo-metallic component is based on an element selected from Group IA, IIA or IIIA of the Periodic Table and will usually be an aluminum compound. Preferably, the aluminum compound is an alkyl aluminum halide or an aluminum trialkyl wherein each alkyl contains less than 8 carbon atoms. Suitable aluminum compounds are aluminum triethyl, aluminum tri-n-propyl, aluminum tri-iso-butyl, aluminum diethylmonochloride and aluminum tri-n-hexyl.

These catalysts may be treated with a wide range of electron donors, including ethers, amides, esters, alkyl halides, halogens, interhalogen compounds, phosphines, phosphonitriles, alcohols, thiols, and thioethers which enhance the catalyst activity or stereo selectivity. These additives are well known in the art.

Ziegler-type catalysts are well known in the art and can be easily prepared by a skilled artisan. This invention is not limited to any particular method of catalyst preparation, but includes within its scope all methods for preparing Ziegler-type catalysts.

The polymerization of alpha-olefins according to the process of this invention takes place most satisfactorily when the polymerization mixture is substantially moisture free and also free of other sources of hydroxyl groups, since hydroxyl groups will destroy the catalytic activity of the chain growing nucleus. The polymerization mixture in the process of the present invention is also preferably kept free of oxygen and carbon dioxide, since these compounds can react with the initiator.

Temperature and pressure conditions for the process may be chosen within the usual range of from $-20°$ C. to $+160°$ C. and from atmospheric pressure to 25 atmospheres. Temperatures of from room temperature to $150°$ C. and pressures of from 5 to 10 atmospheres are preferred.

This polymerization may be carried out continuously or batchwise in the presence or absence of diluents. The polymerization can be conducted in the liquid or slurry phase, i.e. the catalyst is suspended in an inert liquid solvent which serves at the reaction medium, or it can be carried out in the gaseous or vapor phase.

Ethylenically unsaturated hydrocarbons are suitable as monomers for this polymerization. Preferred reactants are mono-olefinically unsaturated hydrocarbons. Examples of suitable monomers are propylene, ethylene and butene-1. Of particular interest are polymers made from propylene, ethylene and mixtures thereof.

The halogen compounds which are added according to this invention are selected from the group consisting of dichloroethane, dichloropropane and chlorine gas. Amounts of these halogens used in the polymerization process may vary within wide limits. Adding amounts of from 0.001 to 50 moles of these halogen compounds per mole of transition metal compound has proved to be advantageous. When the halogen used is a dichloroethane or dichloropropane then it is preferable to use between 0.5–20 moles halogen compound per mole transition metal compound. On the other hand, when the halogen compound is chlorine gas, then it is preferable to use 0.5–1 mole halogen per mole transition metal.

It is very important to add the halogen compound to the reaction mixture at the proper time. In this regard, the halogen compound should not be added until at least 5% of the alpha-olefin has been converted to polymer. More preferably, the halogen compound is not added until at least 20% of the alpha-olefin has been converted to polymer. It is also preferable to add the halogen to the reaction mixture before more than 50% of the alpha-olefin has been converted to polymer.

SPECIFIC EXAMPLES

The following examples will serve to illustrate the practice of the invention in more detail. For the purposes of these examples, the activity is defined as the grams of polypropylene produced per gram of titanium per hour.

All examples were conducted in 7 oz. Crown cap pop bottles. The bottles were rinsed with distilled water and dried at 150° C. for at least 24 hours prior to use. The bottles were cooled in a desiccator, capped and purged for 30 minutes with high purity argon via a needle inserted through the rubber septa. The septa had previously been extensively extracted with toluene and dried at approximately 50° C. under reduced pressure.

The bottles were charged with approximately 50 ml. of purified n-heptane and 10 gms. of propylene. Stauffer alpha-TiCl$_3$ AA Type 1.1 (alpha-TiCl$_3 \cdot \frac{1}{3}$ AlCl$_3$), was used as the catalyst in all experiments. The catalyst was prepared as a slurry in n-heptane and was activated with diethyl aluminum chloride. The overall aluminum/titanium ratio was 5.0. The prepared polymerization bottles were charged with the catalyst slurry via syringe, 0.165 millimoles of titanium being used for each experiment. The bottles were placed in the polymerizer bath at 70° C. for 30 minutes. The bottles were then withdrawn from the bath and injected with the desired halogen compound. When the halogen compound was either a dichloroethane or dichloropropane then approximately 15 moles of halogen per mole of titanium was used. When the halogen compound was chlorine gas, then about 1 mole of halogen per mole of titanium was used. The bottles were then returned to the bath for 1.5 hours.

At the end of the two hour run time, the excess propylene was vented and 2 to 3 ml. of methanol-HCl solution was injected to destroy the catalyst. The polymer slurries were poured into 300 to 500 ml. of hot methanol/HCl solution and the products were recovered by filtration. The polymers were dried at 50° C. to 60° C. under reduced pressure for 18 to 24 hours.

The isotactic index was determined by extraction of the total sample for 24 hours in a standard Soxhlet apparatus using n-heptane. The insoluble fraction was dried for 24 hours at 50° C. to 60° C. under reduced pressure. The isotactic index was then calculated by the following formula:

$$\% \text{ Isotactic Index} = \frac{\text{Wt. of n-Heptane Insolubles}}{\text{Wt. of Total Sample}} \times 100$$

Seven examples were conducted following the above described procedure. Comparative Example A was conducted without the addition of a halogen compound. The other six examples each show how the addition of a halogen compound affects the activity of the catalyst and the isotactic index of the polymer. The halogen compound, activity and isotactic index for each of the examples is shown in Table I.

TABLE I
Addition of Halogen Modifier to Propylene Polymerization Process
Temperature: 70° C.
Pressure: 10 Atmospheres
Run Time: 2 Hours

| Example | Halogen Compound[1] | Activity (g.PP/g.Ti-Hr.) | Isotactic Index (%) |
|---|---|---|---|
| A | — | 450 | 89.1 |
| 1 | 1,1 Dichloroethane | 730 | 91.8 |
| 2 | 1,2 Dichloroethane | 480 | 97.6 |
| 3 | 1,1 Dichloropropane | 680 | 90.4 |
| 4 | 1,2 Dichloropropane | 720 | 92.2 |
| 5 | 1,3 Dichloropropane | 640 | 94.8 |
| 6 | Chlorine Gas | 524 | 91.8 |

[1] Added after 30 minutes run time.

Although only a few embodiments of the present invention have been specifically described, it should be appreciated that many additions and modifications can be made without departing from the spirit and scope of the invention. These and all other modifications are intended to be included within the scope of the present invention, which is to be limited only by the following claims:

We claim:

1. A process for polymerizing an alpha-olefin comprising contacting the alpha-olefin with a Ziegler-type catalyst and subsequently adding at least one halogen containing compound selected from the group consisting of dichloroethane, dichloropropane and chlorine gas, with the proviso that said halogen compound is not added until at least 5% of said alpha-olefin has been converted to polymer.

2. The process of claim 1 wherein the halogen is chlorine gas.

3. The process of claim 1 wherein the halogen is 1,1-dichloropropane.

4. The process of claim 1 wherein the halogen is 1,2-dichloropropane.

5. The process of claim 1 wherein the halogen is 1,3-dichloropropane.

6. The process of claim 1 wherein the halogen is 1,2-dichloroethane.

7. The process of claim 1 wherein the halogen is 1,1-dichloroethane.

8. The process of claim 1 wherein the alpha-olefin is selected from the group consisting of propylene, ethylene and mixtures thereof.

9. The process of claim 8 wherein the alpha-olefin is propylene.

10. The process of claim 1 wherein the Ziegler-type catalyst is a complex of titanium trichloride.

11. The process of claim 1 wherein the halogen compound is not added to the polymerization system until at least 20% of the alpha-olefin has been converted to polymer.

* * * * *